United States Patent
Naggar et al.

(10) Patent No.: US 9,916,574 B2
(45) Date of Patent: Mar. 13, 2018

(54) SECURE COMPUTING DEVICE AND METHOD

(71) Applicant: Barclays Bank PLC, London (GB)

(72) Inventors: Michael Naggar, Frisco, TX (US); Ashutosh Sureka, Frisco, TX (US); Shuchi Patel, Frisco, TX (US); Sunil Gattu, Frisco, TX (US); Bacchababu Gupta, Pune (IN)

(73) Assignee: Barclays Bank PLC, London (GB)

( * ) Notice: Subject to any disclaimer, the term of this patent is extended or adjusted under 35 U.S.C. 154(b) by 69 days.

(21) Appl. No.: 13/727,094

(22) Filed: Dec. 26, 2012

(65) Prior Publication Data

US 2014/0122329 A1 May 1, 2014

(30) Foreign Application Priority Data

Oct. 30, 2012 (GB) .................................. 1219514.5
Oct. 30, 2012 (GB) .................................. 1219515.2
Nov. 19, 2012 (GB) .................................. 1220776.7

(51) Int. Cl.
G06Q 20/32 (2012.01)
G06Q 20/34 (2012.01)

(52) U.S. Cl.
CPC ..... G06Q 20/3278 (2013.01); G06Q 20/3552 (2013.01)

(58) Field of Classification Search
CPC .... G06Q 30/06; G06Q 40/00; G06Q 20/3276; G06Q 20/378; G06F 21/62; G06F 21/60; G06F 21/575

(Continued)

(56) References Cited

U.S. PATENT DOCUMENTS 6,023,620 A 2/2000 Hansson
7,540,409 B2 6/2009 Van Overbeke et al.
(Continued)

FOREIGN PATENT DOCUMENTS

CN 100555298 10/2009
CN 101334824 10/2011
(Continued)

OTHER PUBLICATIONS

IronKey launches secure USB flash drive with internet protection services. (Jul. 30, 2007). Business Wire Retrieved from https://dialog.proquest.com/professional/docview/673735129?accountid=142257 (Year: 2007).*

*Primary Examiner* — Richard C Weisberger
(74) *Attorney, Agent, or Firm* — Cowan, Liebowitz & Latman, P.C.

(57) ABSTRACT

A method and device are described for maintaining software components in a portable electronic device. The device includes memory storing software components executable from the device, with associated pairs of logical storage partitions for storing different versions of the software components, a data interface for coupling the device to a host computer, a contactless interface for receiving payment token data from a contactless payment token, and a cellular network interface for communication of data over a cellular network. An upgrade process is initiated when the device is coupled to the host computer. Data including a different version of at least one of said software components is received, installed and executed to initiate a payment transaction with a remote system. Payment token data is received via the contactless interface means and transmitted to the remote system.

9 Claims, 6 Drawing Sheets

(58) Field of Classification Search
USPC .............................. 705/35–45, 66; 235/375
See application file for complete search history.

(56) References Cited

U.S. PATENT DOCUMENTS

| | | | |
|---|---|---|---|
| 8,024,790 B2 | 9/2011 | Zhao et al. | |
| 8,392,498 B2* | 3/2013 | Berg et al. | 709/202 |
| 8,714,439 B2* | 5/2014 | Brendell et al. | 235/375 |
| 9,152,797 B2* | 10/2015 | Bilke | G06F 21/60 |
| 2004/0177258 A1 | 9/2004 | Ong | |
| 2006/0174109 A1 | 8/2006 | Flynn | |
| 2007/0067020 A1 | 3/2007 | Rea | |
| 2008/0307409 A1 | 12/2008 | Lu et al. | |
| 2009/0044268 A1 | 2/2009 | Tak | |
| 2009/0276534 A1 | 11/2009 | Jevans et al. | |
| 2009/0276617 A1 | 11/2009 | Grell et al. | |
| 2009/0276623 A1 | 11/2009 | Jevans et al. | |
| 2010/0064063 A1 | 3/2010 | Deforche et al. | |
| 2010/0203870 A1 | 8/2010 | Hubinak et al. | |
| 2010/0250790 A1* | 9/2010 | Kielsznia | G06F 13/4004 710/17 |
| 2010/0250796 A1 | 9/2010 | Jevans et al. | |
| 2011/0078081 A1 | 3/2011 | Pirzadeh et al. | |
| 2012/0173431 A1* | 7/2012 | Ritchie et al. | 705/65 |

FOREIGN PATENT DOCUMENTS

| | | |
|---|---|---|
| DE | 102004059265 | 6/2005 |
| DE | 102004023903 | 12/2005 |
| DE | 202010011707 | 1/2011 |
| EP | 1606914 | 12/2005 |
| EP | 1 785 902 A1 | 5/2007 |
| EP | 2 096 538 A1 | 9/2009 |
| EP | 2107463 | 10/2009 |
| EP | 2026213 | 7/2011 |
| EP | 2431906 | 3/2012 |
| EP | 2434424 | 3/2012 |
| EP | 2458569 | 5/2012 |
| GB | 2475787 | 6/2011 |
| WO | WO2004079988 | 9/2004 |
| WO | WO2005055018 | 6/2005 |
| WO | WO2009135196 | 11/2009 |
| WO | WO2009137371 | 11/2009 |
| WO | WO2011064539 | 6/2011 |

* cited by examiner

SECURE COMPUTING DEVICE AND METHOD

FIELD OF THE INVENTION

This invention relates to secure data storage, access and communication, and more particularly to a system, device and method for maintaining software applications in a secure computing environment.

BACKGROUND OF THE INVENTION

Secure computing environments that store and run software applications from a portable electronic Universal Serial Bus ("USB") flash memory device plugged into a host computer are generally known, such as IronKey, Imation, Option CloudKey and Kobil mIDentity. Typically in such environments, the USB flash memory device itself is adapted to provide secure authentication to the associated service and data encryption. However, the USB flash memory devices, in known environments, rely at least in part on use of the host computer for processing and communication of data for a transaction. Therefore, known computing environments are susceptible to security breaches from malicious software or hardware resident on the host computer.

As such secure computing environments become more prevalent, there is a need for improved systems and techniques to provide enhanced security and utility of software application data that is stored and used by such devices.

STATEMENTS OF THE INVENTION

According to one aspect of the present invention, there is provided a computer-implemented method for maintaining software components in a portable electronic device including a memory storing software components executable from the device, a data interface for coupling the device to a host computer, a contactless interface for receiving payment token data from a contactless payment token, and a cellular network interface for communication of data over a cellular network. The method is accomplished by initiating an upgrade process when the portable electronic device is coupled to the host computer and receiving data including a different version of at least one of the software components. The method further includes installing the received version of the at least one software component and executing the installed software components to initiate a payment transaction with a remote system. Payment token data is received via the contactless interface and is transmitted to the remote system.

According to another aspect of the present invention, there is provided a computer-implemented method for maintaining software components in a portable electronic device including a memory storing software components executable from the portable electronic device from an active partition, a data interface for coupling the portable electronic device to a host computer, a contactless interface for receiving payment token data from a contactless payment token, and a cellular network interface for communication of data over a cellular network. The method is accomplished by the steps of providing an associated pair of first and second logical storage partitions for storing different versions of a software component, wherein the first partition is configured as the active partition storing a current version of the software component. The method further includes receiving and storing data including a new version of the software component in the second partition and configuring the second partition to be the active partition.

Preferably, the received version of the at least one software component is installed into an inactive partition, and switched with an active partition storing a previous version of the at least one software component. The software components may include one or more of a boot loader, a root file system, a kernel, a browser application, an application user interface and a Secure Socket Layer ("SSL") certificate.

Preferably, the portable electronic device establishes a secure connection with a remote mobile gateway over the cellular data network, and receives data including a new version of a software component over the cellular network via the cellular network interface.

Preferably, the upgrade process includes determining one or more software components in the portable electronic device that can be updated with a new version stored on a remote upgrade server. The software components that can be updated is determined by comparing a local policy data file stored on the portable electronic device with a remote policy data file received from the remote upgrade server.

Preferably, the application software further configures the portable electronic device to establish a secure connection with a remote mobile gateway over the cellular data network. The data interface comprises a Universal Serial Bus ("USB") data interface, the memory comprises a non-volatile flash memory, and the contactless payment token is a Near Field Communication ("NFC") capable payment card or mobile device.

Preferably, the software components include a web browser for displaying an application interface including a web form for initiating the payment transaction, and the application software further configures the portable electronic device to automatically populate the web form with the received payment token data.

In other aspects, there is provided a portable electronic storage device comprising means for performing the methods as described above. In a further aspect of the present invention there is provided an associated computer program arranged to configure a system or device to carry out the above methods.

BRIEF DESCRIPTION OF THE DRAWINGS

There now follows, by way of example only, a detailed description of embodiments of the present invention, with references to the figures identified below.

FIG. 4, which comprises

DETAILED DESCRIPTION OF THE INVENTION

Secure Computing Environment

Portable USB flash memory devices that store and run software applications completely within the device itself are a way of providing highly secure control and access to online services in a secure computing environment, without using the network connection of the host computer to which the USB flash memory device is connected. In an online banking environment for example, the USB flash memory device provides secure access to a user's financial account data and account services provided by an online banking backend system, via custom browser software securely stored on the device that is automatically loaded and executed when the USB flash memory device is connected to a host computer, to render the custom browser user interface (UI) for display to the user.

Figure 1:
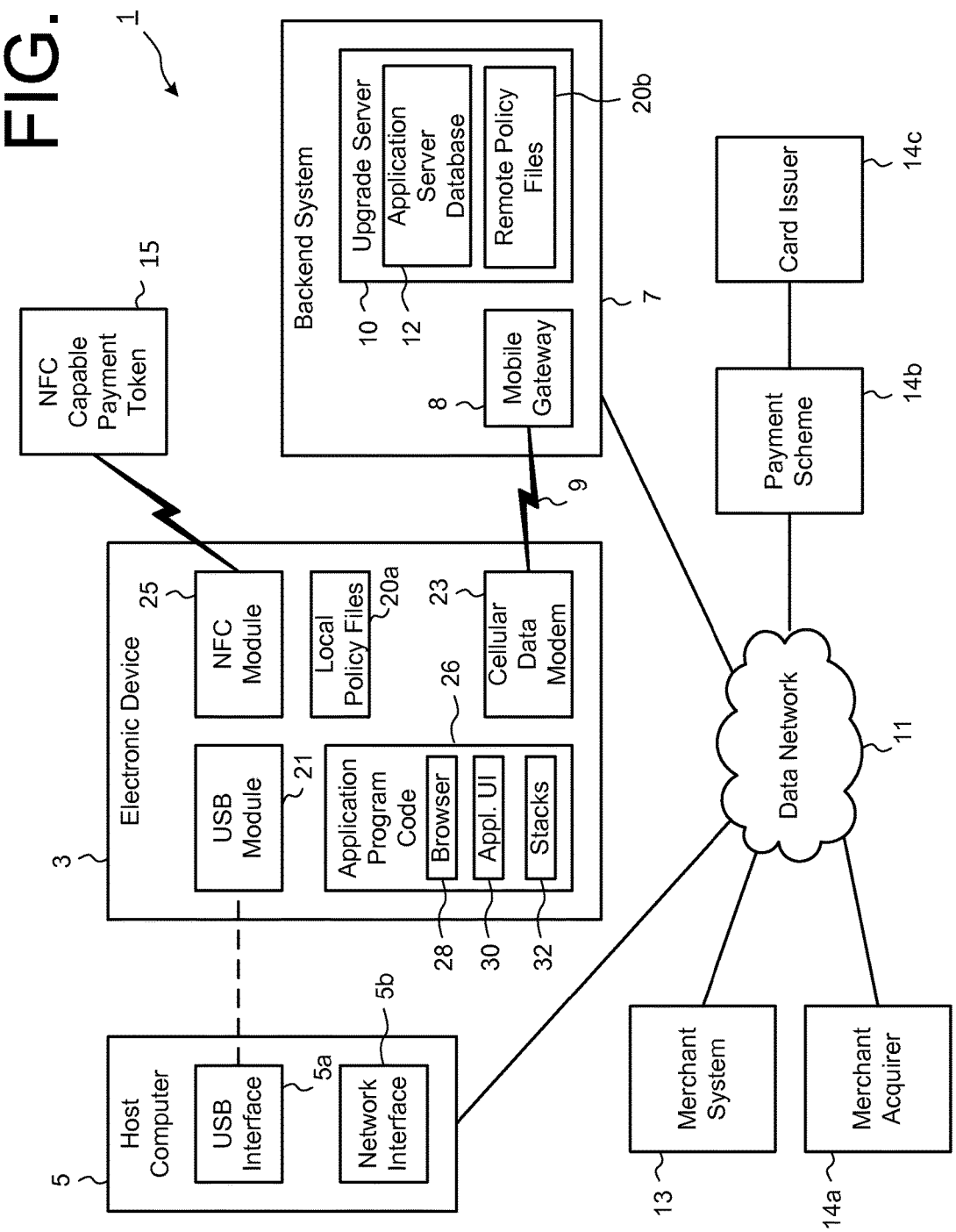
FIG. 1 is a block diagram showing the main components of a secure computing environment.

Referring to FIG. 1, a secure computing environment 1 is made up of a number of components: the portable USB flash memory device (referred to herein as the "electronic device") 3, the host computer 5 and the backend system 7. The electronic device 3 is a secure and self-contained device with a USB serial communication module 21 for connecting the electronic device 3 to a USB interface 5a of the host computer 5. The electronic device 3 also includes an on-board cellular data modem 23 for secure network access to services provided by a backend system 7, via a direct and authenticated connection to a mobile gateway 8 of the backend system 7 over a cellular network 9. The backend system 7 may be a computer server providing APIs (Application Program Interfaces) to customer banking functionalities such as looking up account balance, making payments, making transfers, etc. The mobile gateway 8 is of a type that is known to those skilled in the art of mobile telephony networks and need not be described further. In this embodiment, the backend system 7 includes an upgrade server 10 storing data files for the upgrade process in an application server database 12. The data files for the upgrade process include install packages containing code for the software components, such as application program code 26 that can be installed onto the electronic device 3. Optionally, the upgrade server 10 can be provided as a separate or distributed component, in secure communication with the backend system 7, over the data network 11 for example.

As will be described below, the upgrade process of the present embodiments uses policy data files 20 to keep track of software versions, both currently installed and the latest available. The electronic device 3 stores local policy data files 20a that include data describing the currently installed software components and the associated version identifiers. The upgrade server 10 stores remote policy data files 20b that includes data describing the latest available software components and the associated version identifiers. Each policy data file 20 may include data associated with one or more respective software component. Typically, a single remote policy data file 20 is provided for a particular software update release, including data identifying the latest versions for each of the associated software components of that release. As an example, the policy data files 20 are based on the standard .INI file format and specify the following for each software component: component name, latest available version, install package size (used to verify the file after download) and package signature (used to verify the digital signature of the package).

Optionally, the policy data files 20 may further include an overall release version number and a mandatory/optional data field indicating whether the overall release is mandatory or optional. The mandatory/optional data field can be used to provide the user with the option to skip specific component(s) during the upgrade process. The policy data files 20 may also include a data field identifying the last mandatory version for an associated software component, which is useful when a user is going through an upgrade process after missing a number of incremental updates over a period of time. By way of example, a user may currently have an old version #2 of the browser application 28 installed on the electronic device 3. The latest software component update release includes a much newer version #6 of the browser application 28, but the remote policy data file 20b indicates that this is an optional upgrade. However, the last mandatory version for the browser application 28 can be indicated as version #5. This means that while version #6 is an optional update, since the electronic device 3 has not yet been upgraded with the mandatory version #5, which would be the minimum version required for upgrade, the browser application 28 component will be treated as requiring a mandatory upgrade to at least the latest mandatory version. Alternatively, the browser application 28 component can be upgraded directly to the latest available version, or the electronic device 3 can prompt the user for their preference and selection, via the host computer 5.

The USB serial communication module 21 provides a link between custom browser software 28 and security and network stacks 32 on the electronic device 3, in order to translate and transmit HTTP/HTTPS requests from the custom browser 28 running on the electronic device 3 via the host computer 5 over the USB serial communication module 21 and the serial USB interfaces 5a, and to return the responses back to the browser 28. Optionally, this USB serial communication module 21 can also include a set of interfaces that allow the custom browser 28 access to custom functions on the electronic device 3.

The cellular network 9 may be any suitable cellular data communication network such as GPRS (General Packet Radio Service), EDGE (Enhanced Data-rates for Global Evolution), 3G (third generation of mobile phone mobile communications standards), LTE (Long Term Evolution), or 4G (fourth generation of mobile phone mobile communications standards), for example. The host computer 5, which can be a personal computer, portable laptop, tablet PC, or the like, typically communicates data over a data network 11 via a communication network interface 5b. The host computer 5 may also include components included in commonly known computing devices, such as a processor, a display, user input devices and controllers, etc., which are not shown for clarity. The data network 11 may be any suitable data communication network such as a wireless network, a local- or wide-area network including a corporate intranet or the Internet, using for example the TCP/IP protocol. Such communication protocols are of a type that are known to those skilled in the art of data networks and need not be described further.

The USB electronic device 3 also includes circuitry and logic to enable contactless payment transactions. In this embodiment, a Near Field Communication (NFC) module 25 is provided to communicate data with an NFC capable payment token 15, such as an NFC payment card or NFC capable mobile device with integrated payment software and/or hardware as are known in the art. Components of the host computer 5 can also be in communication with a merchant system 13, which could be for example a merchant's Point of Sale (POS) back-end system or an online merchant's website server system, as well as merchant acquirer 14a, payment scheme 14b and card issuer 14c components over the data network 11, which are typically provided for authorizing and settling payment transactions with the merchant system 13, and need not be described further.

In the normal user operation, the user plugs the electronic device 3 into the host computer 5 to automatically initiate a boot up process on the electronic device 3, before loading and launching application program code 26 stored on the electronic device 3. In an embodiment, the application program code 26 includes an application UI 30, that can be built in HTML5 for example, and a custom browser application 28 that is used to render the application UI 30 to the user on the host computer 5. Preferably, the browser application 28 is customized to restrict use for only the device application UI 30. The browser application 28 is coupled to the USB serial communication module 21 to make HTTP requests and receive responses via the electronic device 3 rather than directly using the host computer's network interface 5b.

Electronic Device Architecture

Figure 2:
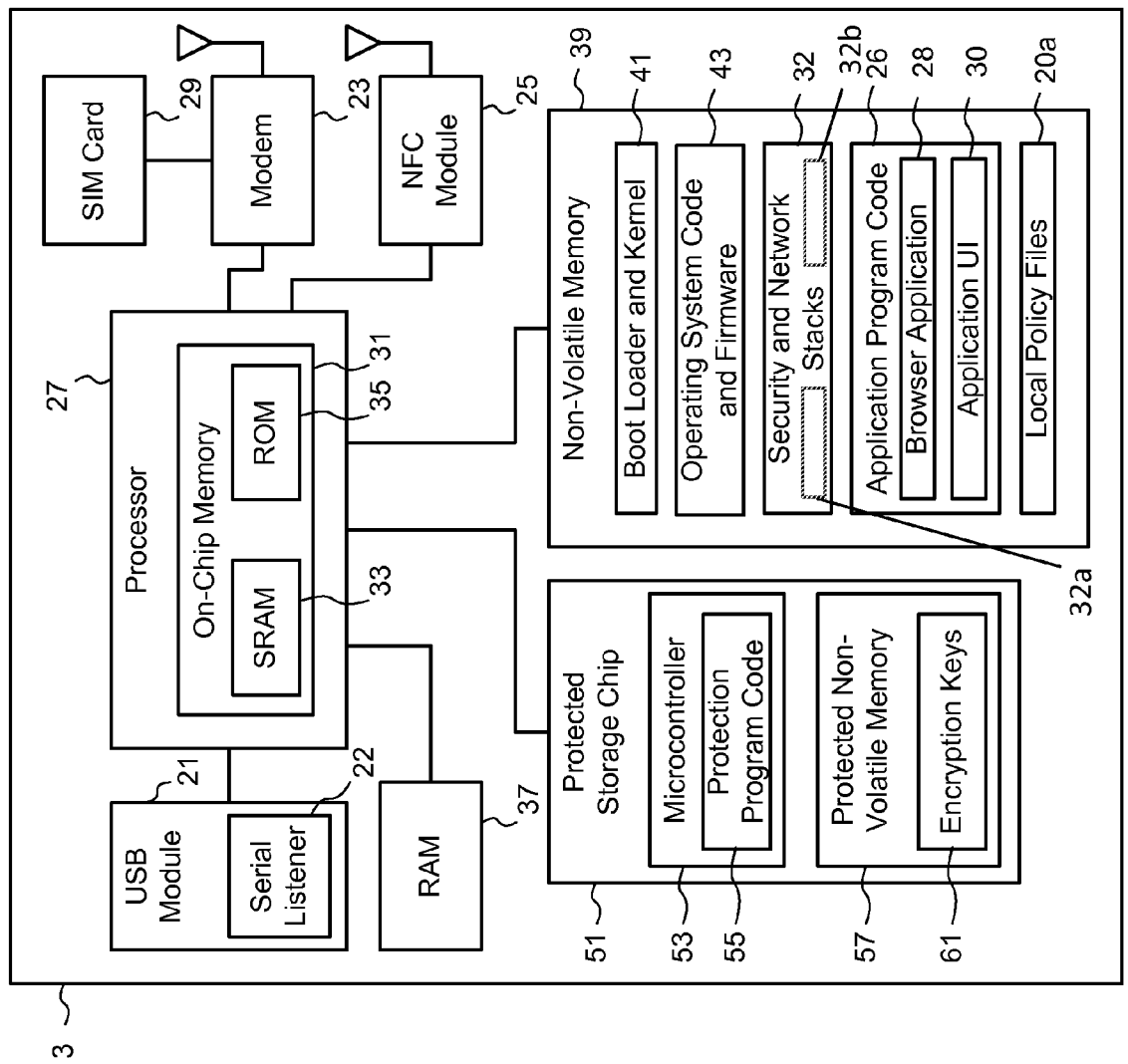
FIG. 2 is a block diagram showing the main components of an electronic device in the secure computing environment of FIG. 1 according to an embodiment of the invention.

Referring to FIG. 2, an electronic device 3 according to an embodiment of the invention includes the USB serial communication module 21 and modem 23, as discussed above, that are coupled to a processor 27. The electronic device 3 also includes a Subscriber Identity Module (SIM) 29 coupled to the modem 23, and an NFC module 25 and associated antenna. The processor 27 may be any type of processor, including but not limited to a general-purpose digital signal processor or a special purpose processor. Optionally, the processor 27 may include on-chip memory 31, for example Static Random Access Memory (SRAM) 33 and Read Only Memory (ROM) 35. The processor 27 is also coupled for access to volatile Random Access Memory (RAM) 37 and non-volatile memory 39 of the electronic device 3, for example via a data bus (not illustrated for clarity).

The non-volatile memory 39 stores code for the various software components installed on the electronic device 3, including boot loader and kernel code 41 executing a boot loader program upon loading, operating system (OS) code and firmware 43, code for the security and network stacks 32, and code for application programs 26, including the custom browser application 28 and the application UI 30. The processor 27 runs the boot loader code 41 upon power up of the electronic device 3, to load the OS code 43, the security and network stacks 32 and the application program code 26 into RAM 37 for subsequent execution by the processor 27. The security and network stacks 32 include a cryptographic library that provides encryption and decryption functionality for data communicated to and from the electronic device 3. Local policy files 20a are also stored in the non-volatile memory 39 to identify the currently installed software components and the associated version identifiers.

Electronic device 3 is configured to route data traffic via the host computer 5, or via the onboard cellular data modem 23. The security stack 32a consists of all the components necessary to ensure secure access to the electronic device 3, including device authorization, user authentication and network traffic encryption. The USB serial communication module 21 integrates with the security stack 32a to apply the necessary encryption and headers to the requests it receives from the browser application 28. The network stack 32b consists of all the components necessary to make HTTP and HTTPS requests over the cellular network 9 and the data network 11. The USB serial communication module 21 also integrates with the network stack 32b to submit the requests it receives from the browser application 28. Optionally, the electronic device 3 is configured with logic to perform routing of requests based on predetermined factors, such as signal strength, bandwidth speed, network data charges, etc. For example, the electronic device 3 can determine connection availability and connection speed over the cellular network 9 and if the cellular data signal is found to be weak or unavailable, the network stack 32b may route the request via the network interface 5b of the host computer 5.

Preferably, the non-volatile memory 39 includes one or more flash memory components, although other forms of non-volatile memory may be suitable. In this embodiment, the non-volatile memory 39 is divided into logical storage partitions 40, including one or more pairs of partitions. For each pair of partitions, an active partition 40A stores an existing version of one or more software components and an associated inactive partition 40B stores a backup or new version of the respective software components.

Figure 3:
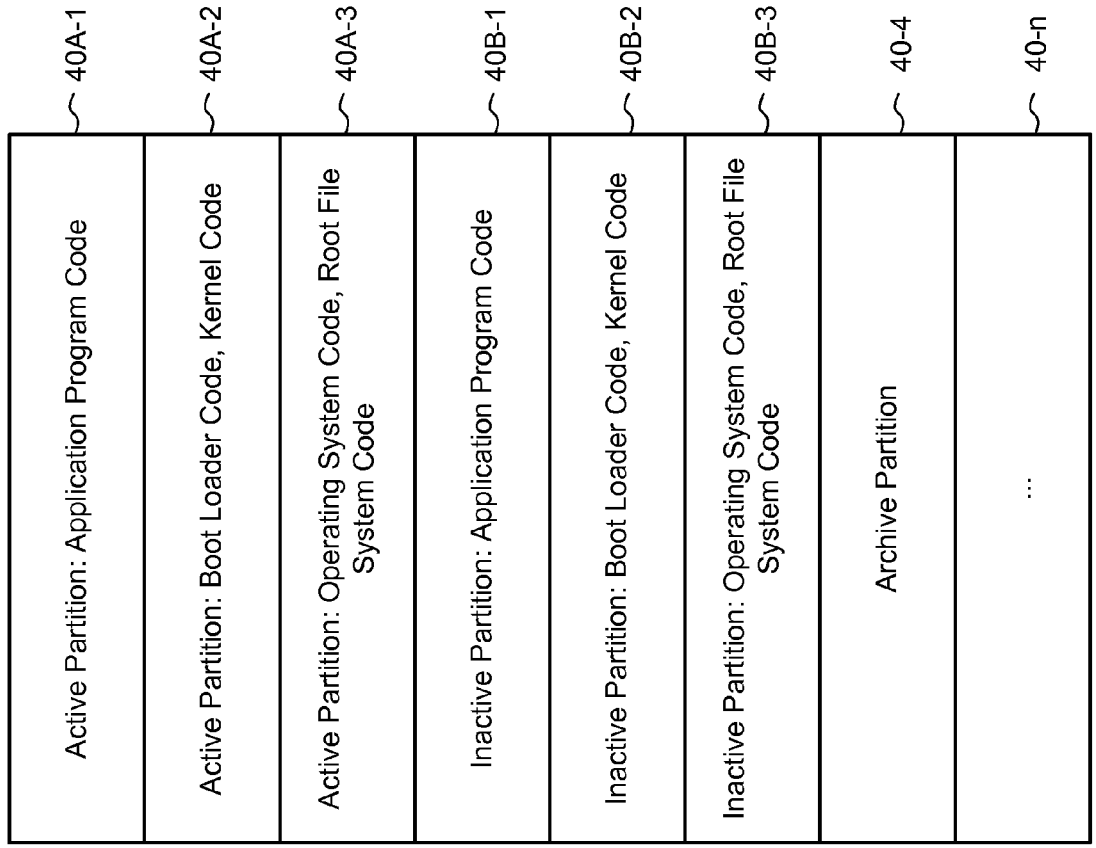
FIG. 3 is a block diagram schematically illustrating an example of pairs of active-inactive logical storage partitions according to an embodiment of the invention.

FIG. 3 is a schematic illustration of an exemplary set of active-inactive pairs of logical storage partitions 40. As shown in this example, the non-volatile memory 39 includes a first active partition 40A-1 storing a current version of application program code 26, a second active partition 40A-2 storing a current version of boot loader and kernel code 41, and a third active partition 40A-3 storing a current version of operating system code 43, which may include root file system code. Also shown in FIG. 3 is a respective inactive partition 40B associated with each active partition 40A, including a first inactive partition 40B-1 for storing a backup or new version of application program code 26, a second inactive partition 40B-2 for storing a backup or new version of boot loader and kernel code 41, and a third inactive partition 40B-3 for storing a backup or new version of operating system code 43 and/or root file system code. In this exemplary embodiment, an archive partition 40-4 is also provided for storing data received from the upgrade server 10 and used by the upgrade process.

Optionally, one or more additional partitions 40-n may be provided, such as, a user data partition for storing non-secured user data used by the software components, a log partition for storing all application and system log files, and one or more further spare partitions for storing future applications and data. As a further option, the data stored in the partitions can be secured, for example by encryption. Additionally, further partition pairs may be provided to store different versions of application program code 26 adapted to run on respective operating systems of different host computers and with different file system architectures and partition types (e.g. FAT, FAT32, NTFS, HFS+, etc.).

Preferably, the electronic device 3 includes a protected storage chip 51 coupled to the processor 27, with a dedicated microcontroller (or microprocessor) 53 for executing protection program code 55 that controls access to encryption key data 61 stored in protected non-volatile memory 57 on the storage chip 51, as described in the Applicant's co-pending application entitled "Device and Method for Secure Memory Access". The protection program code 55 controls access to the protected non-volatile memory 57 by making the stored encryption key data 61 available only during a pre-defined time window, for example within a pre-defined number of clock cycles once the electronic device 3 is powered on. The loading of the encryption key data 61 can be carried out as one of the initial steps in a boot loading (or bootstrapping) process and prior to initiating and accepting any external communications to the electronic device 3. The loaded encryption keys 61 are then available for subsequent use by the processor 27, for example when executing the OS code 43 and the application program code 45 to authenticate a user of the electronic device 3 and to handle service requests to and from the backend system 7. Such key based encryption and decryption techniques are of a type that are known to those skilled in the art of data cryptography and need not be described further. Thereafter, the processor 27 in the boot loader mode executes the remaining instructions to continue normal loading of the boot OS code and initialisation of the external communication interfaces, such as the USB serial communication module 21 and the modem 23.

Optionally, the electronic device 3 can be further adapted to include circuitry and logic to provide a defense against subversion of hardware attacks, such as voltage tampering, etc.

Software Upgrade Process

Figure 4A:
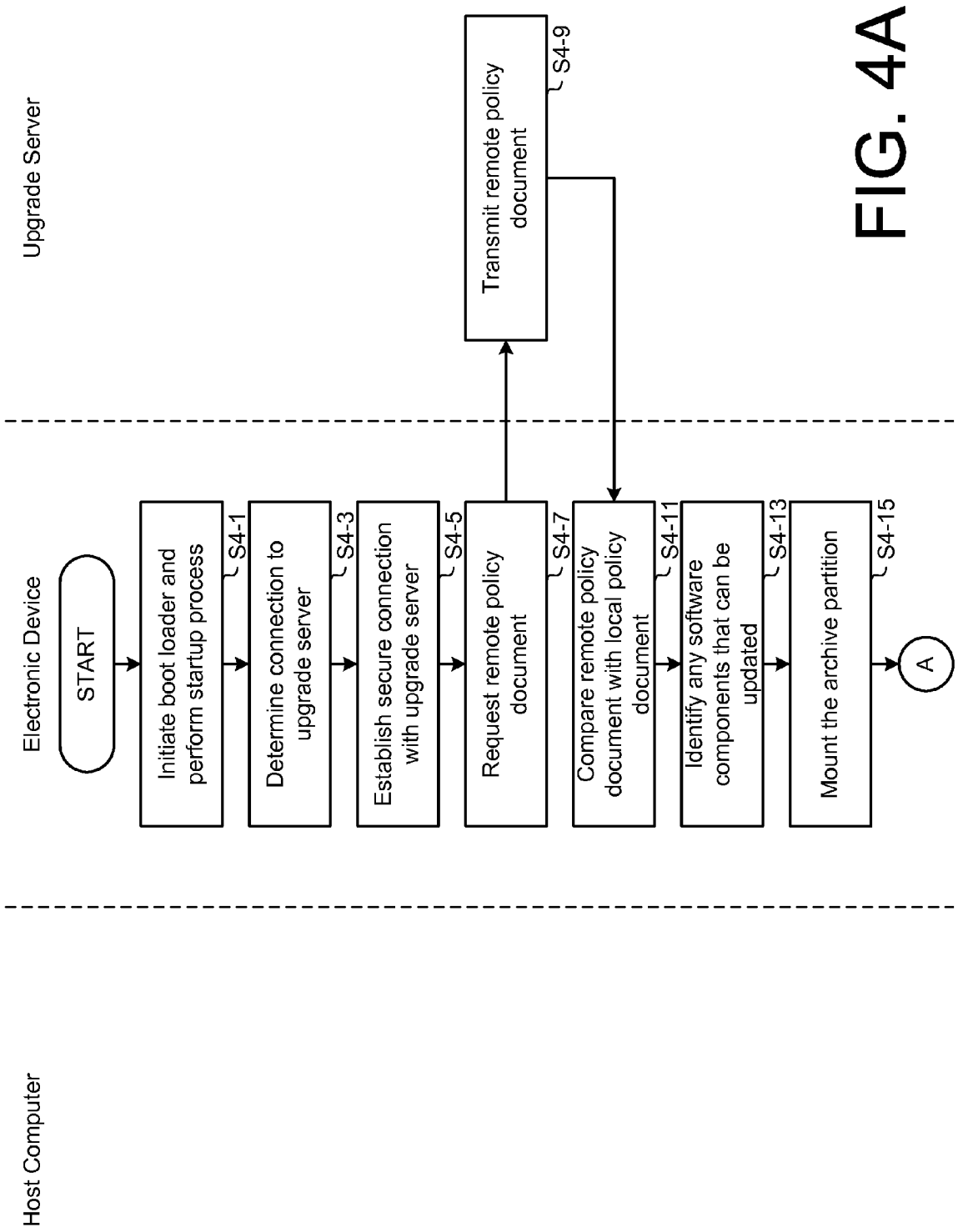
FIGS. 4A and 4B, is a flow diagram illustrating the main processing steps performed by components of the computing environment of FIG. 1 according to a first embodiment.
Figure 4B:
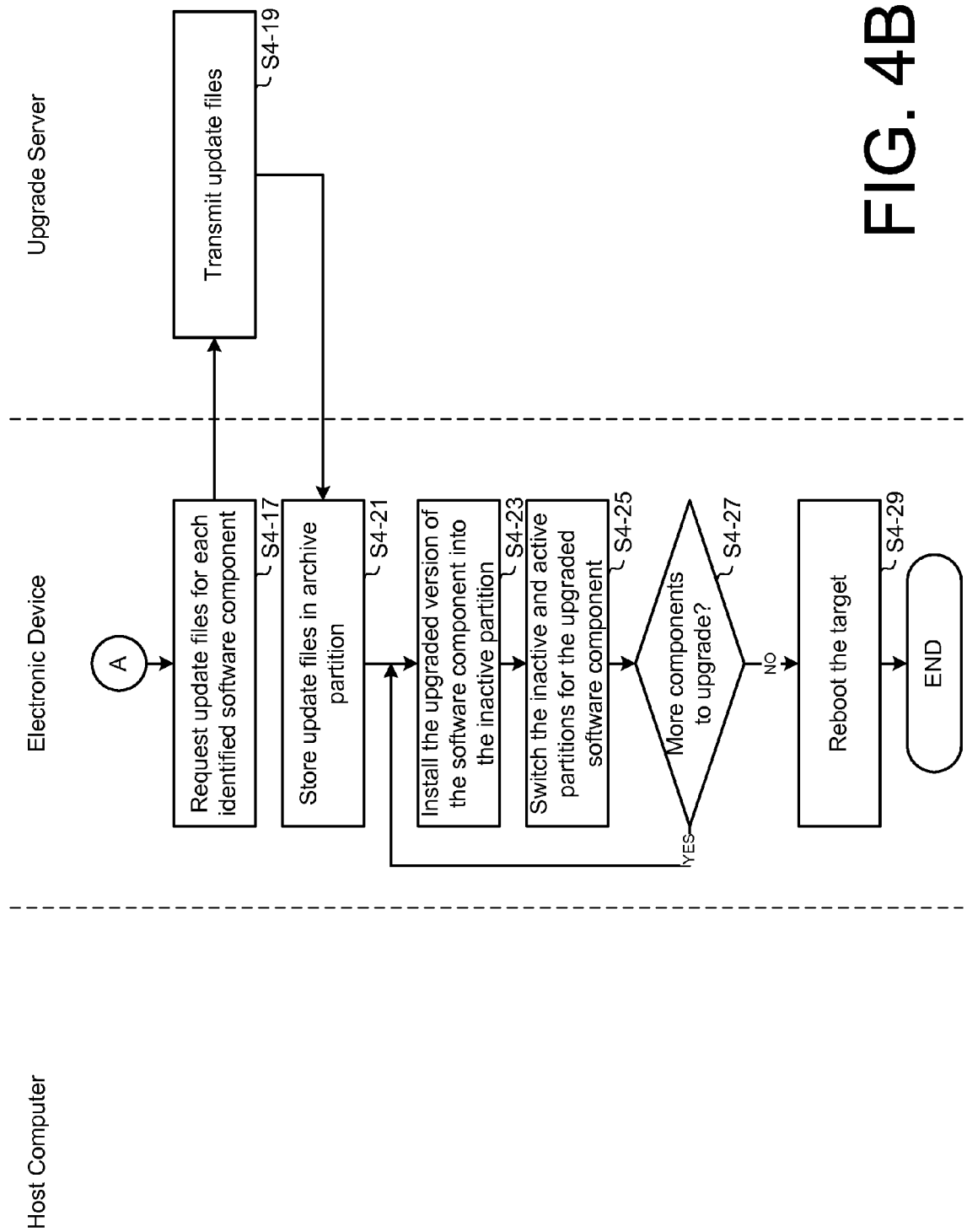

An embodiment of the process of securely upgrading the software components of the electronic device 3 will now be described with reference to FIG. 4. At step S4-1, the user plugs the electronic device 3 into the host computer 5 to automatically initiate the boot loader code 41 stored on the electronic device 3. The boot loader code 41 is executed by the electronic device 3 to (perform hardware and software checks and prepare the kernel and operating system for startup). The boot process may include loading of encryption keys from the protected non-volatile memory 57, as described in the applicant's co-pending application U.S. patent application Ser. No. 13/718,083, the disclosure of which is incorporated herein by reference.

In this embodiment, the boot loader code 41 includes instructions to check if any of the software components stored in the electronic device 3 can be updated to a newer version. Optionally, the electronic device 3 can select one of the available communication paths based on predetermined factors, such as signal strength, bandwidth speed, network data charges, etc. Accordingly, at step S4-3, the electronic device 3 selects one of a data connection over the cellular network 9 or a data connection over the data network 11 via the host computer 5. At step S4-5, the electronic device 3 establishes a secure connection with the upgrade server 10 over the selected connection. Preferably, the electronic device 3 selects the data connection over the cellular network 9, and performs a two-way authentication with the backend system 7 via the mobile gateway 8 for a secured connection.

At step S4-7, the electronic device 3 requests a remote policy data file 20b from the upgrade server 10 using the chosen secured data communication route. In response, the upgrade server 10 retrieves and transmits a stored remote policy data file 20b to the electronic device 3 at step S4-9. Preferably, the remote policy data file 20b is encrypted by the upgrade server 10 for transmission to the electronic device 3. The received remote policy data file 20b is preferably stored in RAM 37 and is processed by the electronic device 3 at step S4-11 to compare the version numbers of the latest available versions of software components stored in the application server database 12 with the version numbers in the local policy data file 20b of the electronic device 3. At step S4-13, the electronic device 3 identifies any software components that can be upgraded with newer versions from the application server database 12.

In this embodiment, the archive partition 40-4 is used to store a downloaded copy of the data files for the upgrade process. Accordingly, at step S4-15, the archive partition 40-4 is mounted to the root file system. It will be appreciated that the downloaded files for the upgrade process may instead be stored in a temporary memory of the electronic device 3. At step S4-17, the electronic device 3 requests update files for the identified software components that can be updated, such as the install packages stored in the application server database 12. Optionally, the electronic device 3 may request additional detailed information about an available newer version of a software component, and may enable user selection of the components that are to be updated. At step S4-19, the upgrade server 10 transmits the requested update files from the application server database 12 to the electronic device 3. Preferably, the update file or files for each identified software component are compressed into a single install package data file for transmission to the electronic device 3. The electronic device 3 stores the received update files in the mounted archive partition 40-4, at step S4-21.

At step 4-23, the electronic device 3 proceeds to install the upgraded version of each identified software component from the archive partition 40-4 into the respective inactive partition 40B associated with the software component. For example, updated browser application code 28 and updated application UI code 30 can be stored in the first inactive partition 40B-1, updated boot loader and kernel code 41 can be stored in the second inactive partition 40B-2, and updated operating system code 43 and root file system files can be stored in the third inactive partition 40B-3. After the updated software component is installed to the respective inactive partition 40B, the electronic device 3 makes the inactive partition 40B for that software component the active partition, at step S4-25. The previously active partition 40A is made inactive, to effectively and efficiently switch the pair of partitions 40A, 40B for the updated software component. In this way, the new inactive partition 40B stores a copy of the older version of the software component as a backup or for subsequent rollback. It will be appreciated that the electronic device 3 can store data identifying which ones of the partitions 40A, 40B are active, for example as respective pointers to the active partitions 40A and/or as an active partition table.

A special case to note is when two or more software components of the electronic device 3 are stored on the same partition. In this embodiment for example, the browser application 28 and corresponding HTML-based application UI 30 reside on the same partition 40A. If both components are being upgraded in the same update release, then there is no special handling needed. However, when only one of the components (e.g. the browser application 28) is being upgraded by an update release, the current version of the other component (e.g. the application UI 30) is copied from the active partition 40A-1 to the inactive partition 40B-1. Then the new version of the first component is upgraded by installing the received install package to the inactive partition 40B-1, before the pair of active-inactive partitions 40-1 are swapped. This results in the new active partition 40A-1 having correct versions of both components and a software rollback of this component to the new inactive partition 40B-1 will return to the respective last stored backup version of each component, as expected. Alternatively, each software component could be separated and stored in respective distinct partitions, to simplify the upgrade process. However, it is appreciated this alternative arrangement can result in a significantly large number of partitions, with detrimental impact on the efficiency of the system.

At step S4-27, the electronic device 3 determines if any more software components are to be upgraded, and steps S4-23 and S4-25 are repeated to upgrade the remaining software components. After all the updates for the identified software components have been installed, the electronic device 3 is rebooted at step S4-29.

In this way, maintenance of the software components installed on the electronic device 3 is managed efficiently and in a secure manner. For example, the electronic device 3 of the present embodiments provides the ability to remotely manage software and firmware upgrades of as many components as possible so the devices can be upgraded in the field, while maintaining software package security. Additionally, flexibility is provided by the ability to upgrade various components or software sub-systems independently, and by the ability to efficiently rollback to previous versions or releases by swapping the active-inactive pair of partitions when needed.

Device and User Authentication Process

An example of the process of device and user authentication using the electronic device 3 after the boot up process will now be described with reference to FIG. 5. After the user has plugged the electronic device 3 into the host computer 5 and the electronic device 3 has completed the boot up process, the electronic device 3 proceeds to load and launch application program code 26 stored on the electronic device 3, at step S5-1. In the exemplary embodiment, the custom browser application 28 is launched and used to render and display the application UI 30 to the user in the host computer 5 environment. The user can interact with the application UI 30 being displayed in the browser 28, for example by clicking a link or a button to select one or more functions or services that requires communication with the mobile gateway 8 of the backend system 7. In response, the browser application 28 sends a data request to a serial communication handler (not illustrated) on the host computer 5, responsible for interfacing with the USB serial communication module 21 of the electronic device 3. The serial communication handler sends the data requests to a serial listener 22 of the USB serial communication module 21, for example via a USB serial driver installed on the host computer 5.

At step S5-3, the processor 27 of the electronic device 3 requests a secure connection to the mobile gateway 8 of the backend system 7 over the cellular network 9, before user requests can be securely communicated with the backend system 7. Accordingly, at step S5-5, authentication and authorization of the electronic device 3 is processed, by authorizing and verifying communication with the mobile gateway 8. The requests are encrypted by the security stack 32a using the encryption keys 61 loaded into the SRAM 33 during the secure boot loading process described above.

In an exemplary implementation, the serial listener 22 of the USB serial communication module 21 sends the data request to the cryptography library of the security and network stack 32, to encrypt the data request using the encryption keys 61. The serial listener 22 submits the request to the network stack 32, which first checks if good cellular signal strength is available via the cellular data modem 23. If a strong cellular signal is detected, the data request is sent to the mobile gateway 8 over the cellular network 9. Otherwise, the request can be submitted using the host computer 5 network interface 5b over the data network 11. It will be appreciated that this is one example of a possible data routing process by the electronic device 3, and in other examples, the routing decision can instead or additionally be based on other predetermined cellular network-related factors, such as bandwidth speed, network data charges, etc. If the request is sent over the cellular network 9, the data request is converted into an encrypted HTTPS request using an Open SSL Library and passed to the cellular data modem 23, which transmits the request to the mobile gateway 8. On the other hand, if the request is sent using the host computer 5 network interface 5b, the serial listener 22 sends the request to the host computer 5 via the serial USB interface 5a. The HTTPS request is sent by the host computer 5 to the mobile gateway 8 over the data network 11 (e.g. the Internet) via the network interface 5b.

At step S5-7, the mobile gateway 8 authorizes and verifies communication with the electronic device 3, in a corresponding manner. The electronic device 3 processes authentication of the user after the electronic device 3 has been authenticated. At step S5-9, the electronic device 3 prompts the user for authentication. User authentication can take one or more of any known forms, for example by prompting the user to input a pre-registered passcode via the application UI 30 and browser application 28, or via additional communication interfaces (not shown) that are made available on the device, such as a thumbprint scanner, dials or buttons to select passcode digits, et. At step S5-11, the host computer 5 receives user input of a passcode via the application UI 30. The user input passcode is verified by the electronic device 3 against a stored pre-registered passcode in order to authenticate the user at step S5-13. At step S5-15, authentication of the user is securely communicated to the mobile gateway 8, which verifies that the user is valid for example by comparing received details with stored records for the user.

At step S5-17, the electronic device 3 receives confirmation from the mobile gateway 8 that the user is authorized. In response to confirmation that both the electronic device 3 and the user are authenticated and authorized, the browser application 28 and application UI 30 display confirmation to the user and proceed with normal user operation at step S5-19, for example by displaying to the user a secure web home page for the services provided by a backend system 7.

Kernel Upgrade Embodiment

An exemplary embodiment of a process of upgrading the kernel software component on the electronic device 3 will now be described for the special case of installing an update of the boot loader and/or kernel code 41. In this embodiment, the electronic device 3 is configured to determine that an installed version of the boot loader and/or kernel code is stable before that version can be stored as a backup version, as described in the upgrade process above. The electronic device 3 stores and maintains a persistent counter, for example in non-volatile memory 39, to count the number of successful boots with that installed boot loader and/or kernel version. The counter is incremented by the electronic device 3 every time the installed boot loader and/or kernel is successfully used to boot the electronic device 3. When the counter reaches a threshold, that version of the boot loader and/or kernel is deemed as a stable version.

Accordingly, when the next kernel upgrade is being performed by the electronic device 3, for example at step S4-23 of the upgrade process described above, the counter is checked to determine whether the currently installed version can be used as a new backup copy. If the kernel is determined to be stable because of a predetermined number of successful boots, the installed version of the kernel code found in the boot loader and kernel code 41 can be used as a new backup copy. In this embodiment, a back up copy of the current installed kernel is first stored on the inactive partition 40B-2 and the new version of the kernel is installed directly on the active partition 40A-2. On the other hand, if the current installed version of the kernel has proven to be unstable for any reason, the counter will be under the threshold because that version of the kernel has not been used enough times to know if it is stable. In this case, the kernel code 41 backup step is skipped. As a result, a previously known stable kernel as stored in the inactive partition 40B-2 would continue to be available as a backup copy should a rollback be necessary.

Optionally, if the electronic device 3 is not able to boot successfully using the kernel installed on the active partition 40A-2, the electronic device 3 can attempt to boot from the inactive kernel partition 40B-2. If this is successful, the electronic device 3 will swap the active/inactive kernel partitions 40-2. The electronic device 3 can also store data identifying that the now inactive kernel partition 40B-2 is known to contain a bad kernel image, in order to prevent another rollback that would otherwise cause that partition 40B-2 with the unstable version of the kernel code to again become active.

As mentioned above, the failover detection logic, described above, also applies to a bad boot loader. The switchover is controlled by the microcontroller 53 used to store the security encryption keys 61. The microcontroller 53 is also used for storing the partition map and the failover detection logic described above. The microcontroller 53 controls the boot mode, i.e. whether it boots the image on the portable USB flash memory device 3 or boots via USB (from host computer 5). In normal use, it will boot using the boot image on the portable USB flash memory device 3. When the device 3 powers up, the microcontroller 53 first sets the pins to boot from the appropriate device (USB vs the processor) and then waits for a call to read the encrypted keys (only in normal use mode). The bootlets first start, request the encryption keys 31 from the microcontroller 53, decrypt them using root key and then load the encryption keys 31 into DCP (data communication protocol) slots. If this request to read the encryption keys 31 from the microcontroller 53 does not get sent to the microcontroller 53, it knows something went wrong and will increment the failed boot counter for that partition (stored within the microcontroller 53). If this counter has not reached the threshold yet, it will attempt a reboot from the same partition. When it does reach the threshold, it will do a switch over to the inactive partition before rebooting. If the electronic device 3 can not boot from the inactive partition image either (same logic with counter threshold), the microcontroller 53 will switch the electronic device to the safe boot mode, i.e. boot from USB (from host computer 5). In this mode, one will be able to use the manufacturing tool to reload the software images.

Background Upgrade Embodiment

Figure 5:
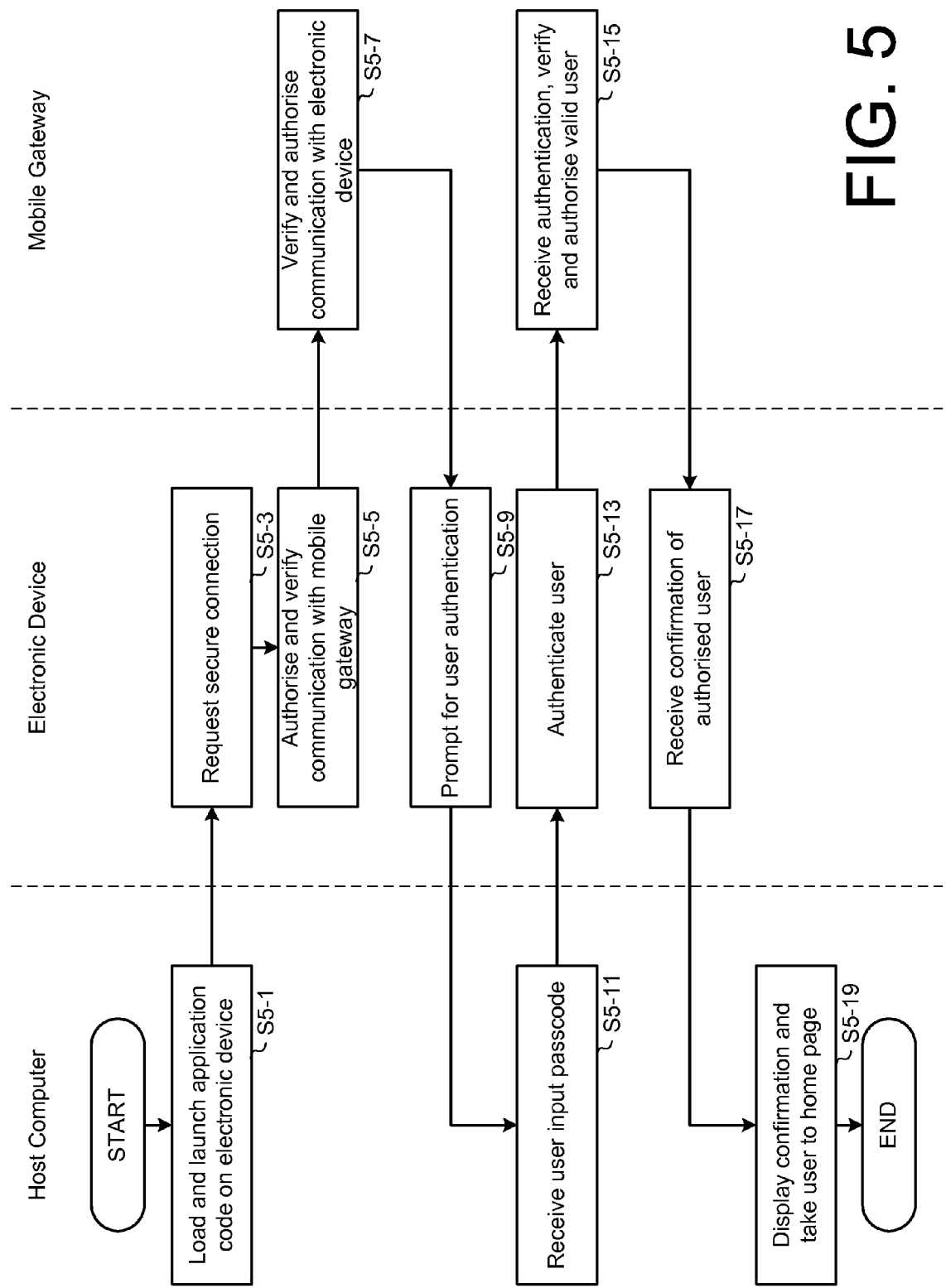
FIG. 5 is a flow diagram illustrating the main processing steps performed by components of the computing environment of FIG. 1.

In the embodiment described above with reference to FIG. 4, a user must wait until the upgrade process is complete, including downloading and installing all components, before the electronic device 3 can be used as described for example with reference to FIG. 5. As an alternative embodiment, the electronic device 3 is configured to allow a user to continue using the electronic device 3 while the upgrade is in progress. This is achieved by facilitating download of the requested update files for the upgradeable software components as a background operation by the operating system of the electronic device 3. However, a problem arises because the user may be unaware this an upgrade process is happening, and it is possible that the user disconnects the electronic device 3 from the host computer 5 in the middle of a download, thus disconnecting the power supply to the electronic device 3, as well as a tethered data connection via the host computer 5 if in use.

In this alternative embodiment, the above identified problem is addressed by providing a resume capability in the upgrade process. Following on from the example above, when the electronic device 3 is plugged in to the host computer 5 the next time, the electronic device 3 will again check for available upgrades on the upgrade server 10. Since the upgrade was not completed the last time, the electronic device 3 will still find upgradeable software components after comparing the received remote policy data file 20b with the local policy data file 20a. The electronic device 3 can then check what, if any, update files have already been downloaded for this update release by comparing the file size with the file sizes identified in the remote policy data file 20b. The electronic device 3 will skip the request for previously downloaded upgrade files that are already stored in the archive partition 40-4, and resume downloading the remaining update files as necessary. Partially downloaded files can be managed via an appropriate download manager as is known in the art, with corresponding support from the upgrade server 10 to stream partially downloaded files. Once all the update files are downloaded, the electronic device 3 can save an indicator that a new version is available for installation. The next time the electronic device 3 is plugged in, the user can be prompted to complete the installation of the downloaded updates. Alternatively, the user can be prompted to complete the installation during user logoff prior to disconnecting the electronic device 3, or at any other appropriate point by the application UI 30.

Alternative Embodiments

It will be understood that embodiments of the present invention are described herein by way of example only, and that various changes and modifications may be made without departing from the scope of the invention.

For example, in the embodiments described above, the software upgrade process is initiated by the boot loader code that checks for software components of the electronic device that can be updated, effectively as part of the boot process. It will be appreciated that this is one exemplary sequence of processing steps to carry out the upgrade process. As an exemplary alternative, the boot loader can instead be configured to fully boot the kernel and initiate one or more software application modules, such as the browser application. In this alternative, the software application modules themselves can include the code to check for and perform the upgrade process, including requesting a remote policy document from the upgrade server for that particular module, identifying if the module can be updated and upgrading components of the module, as described in the embodiments above.

In the embodiments described above, the portable electronic device is a USB flash memory storage device. It will be appreciated that the portable electronic device may be any device that is portable and used to store digital information. Additionally, the data communication interface between the portable device and a host computing device or platform may be any form of standard or proprietary computing interface, such as IEEE 1394 (Firewire), SCSI, Thunderbolt, Lightning, etc.

In the embodiments described above, the electronic device is powered by the host computer via the USB interfaces when connected. Optionally, the electronic device can include a battery and associated power charging circuitry, for powering the components of the device and enabling persistent storage of data in volatile memory if necessary. In this alternative, the secure computing environment can trigger remote updates even when the electronic device is not plugged in. The onboard battery will enable the processor on the electronic device to be powered up to perform the local operations described in the embodiments above, initiated by receiving a remote command from the upgrade server for example. This can happen in several exemplary ways. 1) Push: On a 3G-enabled electronic device, the command can be sent as an SMS message to the device over a closed network provided by the 3G carrier. Upon receipt of the message, the upgrade process can be triggered to execute on the device using the power in the onboard battery, if charged. This capability is useful to carry out upgrades with no user intervention, particular advantageous for mandatory upgrades. 2) Polling: The electronic device can switch to a low power mode when not plugged in using the onboard battery. In this mode, only minimal number of processes and functionality are available. The device makes periodic requests to the upgrader server to check if new updates are available.

In the embodiments described above, the cellular network 9 and the data network 11 are illustrated as separate networks. It will be appreciated that the data network itself can include communication links or paths over a cellular communication network such as GPRS, EDGE, 3G, 4G, LTE, for example, or a combination of such communication paths.

The encryption keys, passcodes and the software component version identifiers described above may take any respective form, and may be composed of numeric or alphabetic symbols, non-alphanumeric symbols, or a combination of such symbols.

The upgrade process described in the embodiments above can also be applied to any other type of software component stored on the electronic device in addition to the specific mentioned examples. For example, the upgradeable software components can also include independent components such as Secure Socket Layer (SSL) certificates needed to communicate with the backend system using SSL as well as public certificates for verifying the digital signatures of the install packages. This ability allows the secure computing environment to refresh the certificates by themselves when needed, for example, when current certificates expire and new ones are issued or when certain certificates have been revoked, etc.

Various software implementations are described in terms of the exemplary electronic device. After reading this description, it will become apparent to a person skilled in the art how to implement the invention using other computer systems and/or computer architectures.

The computer programs (also called computer control logic) discussed in the embodiments above, when executed, enable the computer system of the electronic device to implement embodiments of the present invention as discussed herein. Accordingly, such computer programs represent controllers of the computer system. Where the embodiment is implemented using software, the software may be stored in a computer program product and loaded into the computer system using a removable storage drive, hard disk drive, or communication interface, to provide some examples. The terms "computer program medium" and "computer usable medium" are used generally to refer to media such as removable storage drive, a hard disk installed in hard disk drive, and signals. These computer program products are means for providing software to computer system of the electronic device. However, these terms may also include signals (such as electrical, optical or electromagnetic signals) that embody the computer program disclosed herein.

Alternative embodiments may be implemented as control logic in hardware, firmware, or software or any combination thereof. Further alternative embodiments may be envisaged, for example with variations and modifications to the particular sequence of steps described in the embodiments above, which nevertheless fall within the scope of the following claims.

What is claimed is:

1. A portable payment transaction processing device comprising:
   a data interface operable to couple the portable electronic device to a host computer;
   a contactless interface operable to receive payment token data from a contactless payment token;
   a cellular network interface operable to communicate data over a cellular network;
   a memory having an active partition and an inactive partition, said memory storing in said active partition an application software operable to facilitate a payment transaction with a remote system when the device is connected to the host computer; and
   at least one processor configured to:
   initiate an update process when the device is coupled to the host computer, receive data including update data for at least a portion of the application software, and update the stored application software with the received data, by:
   installing the updated application software into said inactive partition; and
   after installing said updated application software to the inactive partition, making the inactive partition a current active partition, and making the active partition a current inactive partition, whereby the current inactive partition stores a backup of the application software; and
   execute the updated application software in the current active partition, to: transmit data defining an application user interface for display by the host computer via the data interface means,
   receive data defining user input via the application user interface from the host computer via the data interface means,
   receive payment token data via the contactless interface, and
   transmit the received payment token data to the remote system via the cellular network interface.

2. The device of claim 1, wherein the at least one processor is further configured to switch back to the partition storing the application software.

3. The device of claim 1, wherein the at least one processor is further configured to determine that the stored application software can be updated with update data stored on a remote upgrade server.

4. The device of claim 3, wherein the at least one processor is further configured to compare a local policy data file stored on the portable payment transaction processing device with a remote policy data file received from the remote upgrade server to determine that the stored application software can be updated.

5. The device of claim 1, further comprising a boot loader that configures the at least one processor to initiate the update process when the device is coupled to the host computer.

6. The device of claim 1, wherein the update data for the application software is received over the cellular network via the cellular network interface.

7. The device of claim 1, wherein the at least one processor is further configured to establish a secure connection with a remote mobile gateway over the cellular data network.

8. The device of claim 1, wherein the at least one processor is further configured to determine that the received payment token data is to be communicated via the data interface instead of the cellular interface based on cellular network availability and/or connection speed.

9. A method implemented by a portable payment transaction processing device having a data interface operable to couple the portable electronic device to a host computer, a contactless interface operable to receive payment token data from a contactless payment token, a cellular network interface operable to communicate data over a cellular network, and a memory having an active partition and an inactive partition, said memory storing in said active partition an application software operable to facilitate a payment transaction with a remote system when the device is connected to the host computer, the method comprising:

initiating an update process when the device is coupled to the host computer;

receiving data including update data for at least a portion of the application software;

updating the stored application software with the received data, by:

installing the updated application software into said inactive partition; and after installing said updated application software to the inactive partition, making the inactive partition a current active partition, and making the active partition a current inactive partition, whereby the current inactive partition stores a backup of the application software; and executing the updated application software in the current active partition, wherein the updated application software transmits data defining an application user interface for display by the host computer and receives data defining user input via the application user interface from the host computer, via the data interface means, receives data defining user input via the application user interface from the host computer via the data interface means, receives payment token data via the contactless interface, and transmits the received payment token data to the remote system via the cellular network interface.

* * * * *